United States Patent [19]

Fujita

[11] Patent Number: 4,999,826
[45] Date of Patent: * Mar. 12, 1991

[54] FOCUSED-SPOT-POSITION DETECTION DEVICE FOR OPTICAL INFORMATION RECORDING AND REPRODUCING DEVICE

[75] Inventor: Teruo Fujita, Kyoto, Japan

[73] Assignee: Mitsubishi Denki K.K., Tokyo, Japan

[*] Notice: The portion of the term of this patent subsequent to Dec. 19, 2006 has been disclaimed.

[21] Appl. No.: 445,298

[22] Filed: Dec. 4, 1989

Related U.S. Application Data

[63] Continuation of Ser. No. 196,190, Apr. 22, 1988, Pat. No. 4,888,757.

[30] Foreign Application Priority Data

Aug. 29, 1986 [JP] Japan ............................... 61-204261

[51] Int. Cl.$^5$ ............................................. G11B 7/00
[52] U.S. Cl. ............................................. 369/44.41
[58] Field of Search ................ 369/44.11, 44.34, 44.41

[56] References Cited

U.S. PATENT DOCUMENTS 4,888,757 12/1989 Fujita ............................ 369/44.34

Primary Examiner—Robert L. Richardson
Attorney, Agent, or Firm—Sughrue, Mion, Zinn, Macpeak & Seas

[57] ABSTRACT

The present invention has an object to provide a focus sensor or tracking sensor for an optical recording and reproducing device, which has a simplified optical system whose adjustment is much facilitated. The operational principle of this device is to produce a focusing error signal or tracking error signal by vibrating light spot on an optical disc with a small amplitude to scan interference fringes produced in the far field on an optical disc on the basis of a periodicity of information tracks of the optical disc and processing output signals of an optical sensor arranged in the far field.

1 Claim, 8 Drawing Sheets

FOCUSED-SPOT-POSITION DETECTION DEVICE FOR OPTICAL INFORMATION RECORDING AND REPRODUCING DEVICE

This is a continuation of application Ser. No. 07/196,190 filed Apr. 22, 1988 now U.S. Pat. No. 4,888,757.

FIELD OF TECHNOLOGY

The present invention relates to a focused-spot-position detection device of an optical information recording and reproducing device in which an information is recorded in and reproduced from an information recording medium and erased by means of light beam and, particularly, to a focusing error and tracking error detection device.

BACKGROUND ART

FIGS. 10 and 11 show an example of a focusing error detection device for an optical head such as shown in Japanese Patent Application Laid-open No. 93223/1977 or J. M. Braat and G. Bouwhuis, "Position Sensing In Video Disc Read Out", Applied Optics, vol. 17, No.13, p.p. 2013–2021, (1978).

In FIG. 10, 1 depicts a light source such as a He-Ne laser and 2 is an auxiliary lens for expanding a diameter of light beam emitted by the light source 1. 3 depicts an information recording medium such as an optical disk, 4 an information recording plane of the information recording medium 3 and 5 an information track, the information recording medium 3 being rotatable around a rotary shaft 6. 7 depicts a half mirror for separating irradiation light to the information recording medium 3 from reflection light from the information recording medium 3, 8 a mirror for bending an optical path of the irradiation light to the information recording medium 3, and 9 an objective lens for focusing the irradiation light from the light source 1 onto the information track 5. 10 depicts a focusing error detection sensor which is composed of a plurality of optical detecting elements. 11 depicts an auxiliary lens for projecting an image formed on an exit pupil of the objective lens 9 by a reflection light from the information recording medium 3 onto the optical detecting elements in the focusing error detecting sensor 10. In FIG. 10, an image of a point a on the exit pulpil of the objective lens 9 is formed on the focusing error detecting sensor 10 as a point a' by the auxiliary lens 11.

In FIGS. 11, 12 and 13 depict the optical detecting elements in the focusing error detecting sensor, 14 a subtractor for providing a difference between output signals from the optical detecting elements 12 and 13, 15 an adder for adding the output signals of the detecting elements 12 and 13, 16 a phase shifter for shifting a phase of an output signal of the adder 15 by 90°, 17 a multiplier for multiplying an output of the phase shifter 16 with the output signal of the subtractor 14, and 18 a low pass filter for passing a low frequency component of the output signal of the multiplier.

The operational principle of this focusing error detecting device is based on the fact that, in reading an information on the information recording plane 4 which acts as a diffraction grating, there is produced a phase difference between 0 order light directly reflected by the information recording medium and the first order diffraction light reflected and diffracted by information pits on an information track thereof and the phase difference corresponds to a focusing error. The phase difference between the 0 order light and the first order diffraction light can be measured by analysing interference fringes in an interference region of the 0 order light and the first order diffraction light in a plane remote enough from the information recording medium, that is, a plane in which the 0 order light and the first order diffraction light can be observed with an enough distance therebetween (the latter plane will be referred to hereinafter as a plane disposed in a "far field" of the information recording medium) and, in the conventional device, a focusing error signal is produced by electrically processing outputs of a plurality of optical detecting elements arranged in the far field.

A coordinate system necessary to describe an operation of this conventional device will be defined firstly. As shown in FIG. 10, $\xi$ and $\eta$ axes are set on the information recording plane 4 of the information recording medium 3 in parallel with a center line of the information track 5 and orthogonally of the center line, respectively. The exit pupil plane of the objective lens 9 which focuses light beam onto the information recording medium 3 is referred to as XY plane, with an origin of the XY plane being made coincident with a center of the exit pupil plane and an X axis being made in parallel with the $\eta$ axis. An entrance pupil plane of the objective lens 9 in which reflection light is fallen is set as an X'Y' plane which is the same plane as the XY plane.

An amplitude distribution on the entrance pupil plane of the objective lens 9 formed by reflection light from the information recording medium 3 is equal to an amplitude distribution on the exit pupil plane of the objective lens 9 existing on the opposite side to the information recording plane and is projected on the optical sensor 10 by the auxiliary lens 11. Therefore, the intensity distribution of light in the far field formed by the reflection light from the information recording medium 3 can be observed on the optical sensor 10. FIG. 12 shows a correspondency of the above mentioned coordinate system. For these real coordinates X, Y, $\xi$, $\eta$, X' and Y', normalized coordinates x, y, u, v, x' and y' are defined as follows:

$$x = X/R, \; y = Y/R \tag{1}$$

$$u = \xi/(\lambda/NA), \; v = \eta/(\lambda/NA) \tag{2}$$

$$x' = X'/R, \; y' = Y'/R \tag{3}$$

where R is a radius of aperture of the objective lens 9, NA is a numercal aperture of the objective lens 9 and $\lambda$ is wavelength of the light source 1.

Now, a mathematical treatment of the information recording plane will be described. (cf. G. Bouwhuis et al, "Principles of Optical Disc Systems", Adam Hilger, p.p. 24–30, (1985))

Looking at an information recording plane of an optical video disc or compact disc, it is found that a plurality of information tracks are arranged on the plane equidistantly (1.6–1.7 $\mu$m gap). This means that such disc is a diffraction grating having a single spatial frequency with respect to a direction orthogonal to the information tracks. As to a direction parallel with the information tracks, an information is recorded by changing pit position, pit period and pit length etc. Therefore, spatial frequency spectrum in a direction parallel with the information tracks is not single but broadened considerably. However, in a case of optical video disc, since a video signal which is frequency modulated is recorded in the form of pulse width modulated, it is possible to consider that spatial frequency in a direction parallel with the information tracks is constant locally and the spatial frequency does not change non-continuously. Therefore, in the case of the optical video disc, it is possible to consider the information recording plane as a two dimensional diffraction grating as shown in FIG. 13.

In FIG. 13, 21 depicts information pit which, in the case of the optical video disc, is a land or recess having a physical depth in the order of 0.1 μm compared with a peripheral portion thereof. Representing a period in the track direction (ξ axis) of the information recording plane and a period in the direction (η axis direction) perpendicular to the information track by P and Q, respectively, periods p and q for the normalized coordinates u and v shown in FIG. 13 become as follows:

$$p = P/(\lambda/NA), \quad q = Q/(\lambda/NA) \tag{4}$$

Since it is possible to consider that the information recording plane having the above mentioned structure provides a light beam incident on the information pit portion a phase delay $\phi s$ proportional to the depth of the pit, an amplitude reflectivity Ro (u,v) can be represented by $$Ro(u,v) = \begin{cases} e^{i\phi s}; & \text{in pit} \\ 1; & \text{otherwise} \end{cases} \tag{5}$$

Since Ro(u,v) is a periodic function both in u and v directions, it can be Fourier-expanded as follows:

$$Ro(u,v) = \sum_{m,n} R_{m,n} \exp[2\pi i(mu/p + nv/q)] \tag{6}$$

$$R_{m,n} = \frac{1}{pq} \int_{-\frac{p}{2}}^{\frac{p}{2}} \int_{-\frac{q}{2}}^{\frac{q}{2}} Ro(u,v) \exp[-2\pi i(mu/p + nv/q)] du dv \tag{7}$$

The reflection light amplutude distribution $A_D(x',y')$ on the focusing error detecting optical sensor 10, which is significant for the focusing error detection, can be represented as follow when $R_{m,n}$ is used. (cf. G. Bouwhuis et al, "Principles of Optical Disc Systems", Adam Hilger, p.p. 24–30, (1985))

$$A_D(x',y') = \sum_{m,n} \exp[-2\pi i(mu_o/p + nv_o/q)]R_{m,n} \cdot a(-x' + m/p, -y' + n/q) \tag{8}$$

where $u_0$ is an amount of movement of the information recording medium in the track direction in the normalized coordinates, $v_o$ is a deviation of track in the direction perpendicular to the track and a(x,y) is irradiation light amplitude distribution on the exit pupil of the objective lens, i.e., pupil function.

It is now considered reflection light intensity distribution on the focusing error sensor 10 when the information recording plane 4 is deviated from a focus point of a focusing beam from the objective lens 9 to the latter by Δf as shown in FIG. 14.

A wavefront aberration coefficient $W_{20}$ of off-focusing corresponding to the off-focus Δf is given by $$W_{20} = NA\Delta f/2\lambda \tag{9}$$

(cf. G. Bouwhuis et al, "Principles of Optical Disc Systems", Adam Hilger, p. 41, (1985)). Therefore, when it is assumed that an optical system from the light source 1 to the information recording plane 4 is aberration free, the irradiation light amplitude distribution a(x,y) on the objective lens can be represented by $$a(x,y) = \begin{cases} \tau(x,y)\exp(2\pi i W_{20}(x^2 + y^2)); & x^2 + y^2 \leq 1 \\ 0; & x^2 + y^2 > 1 \end{cases} \tag{10}$$

The optical detecting elements 12 and 13 have rectangular light receiving surfaces such as shown in FIGS. 11 or 15, respectively, the longitudinal direction thereof being transversal to the information track 5, i.e., in parallel with the y' axis. Further, since the elements 12 and 13 are arranged in an interference region of the (0,0) order reflection light and the (1,0) order reflected and diffracted light, the amplitude distribution $A_{D1}(x', y')$ of reflection light from the information recording medium 3 on the optical sensor can be represented by using the equation (8) as follows:

$$A_{D1}(x',y') = R_{o,o} \cdot a(-x', -y') + R_{1,o} \cdot \exp(-2\pi i u_o/p) \cdot a(-x' + 1/p, -y') \tag{11}$$

In this expression, (m,n) order diffraction light means, among light components of light reflected and diffracted by the information recording medium acting as the two dimensional diffraction grating, diffraction light having diffraction order of m order in the track direction and n order in the direction perpendicular thereto. For example, among light beams emanating from the center (x=0, y=0) of the exit pupil of the objective lens 9, a component thereof which is subjected to the (m,n) order diffraction can reach a point (x'=m/p', y'=n/q) on the optical sensor. Representing a magnitude difference between Fourier coefficients $R_{o,o}$ ans $R_{1,o}$ by α and a phase difference therebetween by $\psi_0$, $$R_{1,o} = \alpha \cdot e^{i\psi_0} R_{o,o} \tag{12}$$

is established. By using the equation 11 in the equation 12, $A_{D1}(x',y')$ can be written as $$A_{D1}(x',y') = R_{o,o}(a(-x', -y') + \alpha \cdot e^{i\psi_0} \exp(-2\pi i u_0/p) \cdot a(-x' + 1/p, -y')) \tag{13}$$

When it is assumed that the amplitude distribution of irradiation light on the exit pupil of the objective lens is constant and $$\tau(x,y) = 1 \tag{14}$$

$A_{D1}(x',y')$ can be represented by using the equation 10 in the equation 13 as follow.

$$A_{D1}(x',y') = R_{o,o}[\exp(2\pi i W_{20}(x'^2 + y'^2)) + \alpha \cdot e^{i\psi_0}\exp(-2\pi i u_0/p)[2\pi i W_{20}(-x' + 1/p)^2 + y'^2))] \tag{15}$$

$$|A_{D1}(x',y')|^2 = |R_{o,o}|^2 [(1 + \alpha^2) + 2\alpha\cos(\psi_0 - 2\pi u_0/p + 2\pi W_{20}(-2x'/p + 1/p^2)] \tag{16}$$

Since, when the information recording medium 3 is rotating around the rotary shaft 6 at a line speed So in the normalized coordinate u, the following equation is established $$U_o = S_o \cdot t \quad (17)$$

the equation 16 can be rewritten as follow:

$$|A_{D1}(',y')|^2 = |R_{a,o}|^2[(1+a^2) + 2_a \cos(\psi_0 - 2\pi s_0 t/p + 2\pi W_{20}(-2x'/p + 1/p^2))] \quad (18)$$

The meaning of the equation 18 is as follow:

(1) There is produced interference fringes in a region of the optical sensor surface disposed in the far field of the information recording medium, where (0,0) order reflection light and (1,0) order reflection and diffraction light overlap each other.

(2) The spatial period of interference fringes is inversely proportional to wavefront aberration coefficient $W_{20}$. That is, The spatial frequency of interference fringe is proportional to $W_{20}$.

(3) Interference fringes vary, with time, at an angular frequency $\omega$ ($=2\pi$ So/p) determined by a ratio between a period p in the information track direction and a line speed So in the same direction.

Therefore, interference fringes observed on the optical sensor surface can be said as a traveling wave propagating along the x' axis, which has a period varying depending upon an amount of $W_{20}$, i.e., off-focusing $\Delta f$ and a traveling direction depending upon a sign of $W_{20}$.

In the conventional device as shown in FIGS. 10 and 11, $W_{20}$, i.e., off-focusing $\Delta f$, is detected as to be described. Firstly, with the center positions of the respective detecting elements 12 and 13 being $x_1 - \Delta x/2$ and $x_1 + \Delta x/2$, respectively as shown in FIGS. 11 or 15, output currents $I_{D1}$ and $I_{D2}$ of the elements 12 and 13 become as follows according to the equation 18:

$$I_{D1,2} = \quad (19)$$
$$K[(1 + a^2) + 2a\cos(\psi_0 - \omega t + 2\pi W_{20}(-2(x_1 \mp \Delta x/2)/p + 1/p^2))] = I_1 + I_2 \cos(\psi_0 - \omega t + 2\pi W_{20}(-2(x_1 \mp \Delta x/2)/p + 1/p^2))$$

where $I_1 = K(1+a^2)$ and $I_2 = K \cdot 2a$. A difference signal $I_{DF}$ and a sum signal $I_{SUM}$ of the elements 12 and 13, which are derived from the subtractor 14 and the adder 15, respectively, are written as follows:

$$I_{DF} \stackrel{\Delta}{=} I_{D2} - I_{D1} \quad (20)$$
$$= 2I_2 \sin(2\pi W_{20} \Delta x/p) \cdot \sin(\psi_0 - \omega t + 2\pi W_{20}(-2x_1/p + 1/p^2))$$

$$I_{SUM} \stackrel{\Delta}{=} I_{D1} + I_{D2} \quad (21)$$
$$= 2I_1 + 2I_2 \cdot \cos(2\pi W_{20}\Delta x/p) \cdot \cos(\psi_0 - \omega t + 2\pi W_{20}(-2x_1/p + 1/p^2))$$

Since, when the off-focusing is not considerably large, the following equation is established $$W_{20} \Delta x/p << 1 \quad (22)$$

the equations 20 and 21 can be simplified as follows, respectively:

$$I_{DF} = 2I_2 \cdot 2\pi W_{20}\Delta x/p \cdot \sin(\psi_0 - \omega t + 2\pi W_{20}(-2x_1/p + 1/p^2)) \quad (23)$$

$$I_{SUM} = 2I_1 + 2I_2 \cdot \cos(\psi_0 - \omega t + 2\pi W_{20}(-2x_1/p + 1/p^2)) \quad (24)$$

Then, the output $I_{SUM}$ of the adder is supplied to the phase shifter 16 to obtain a signal $I_R$ the phase of a.c. component of which is advanced by 90° and which is represented by $$I_R = 2I_2 \sin(\psi_0 - \omega t + 2\pi W_{20}(-2x_1/p + 1/p^2)) \quad (25)$$

and, in the multiplier 17, $I_R$ and $I_{DF}$ are multiplied with each other to obtain a signal $S_M$ which is as follow:

$$\begin{aligned} S_M &= 4I_2^2 \cdot 2\pi W_{20}\Delta x/p \cdot \sin^2(\psi_0 - \omega t + 2\pi W_{20}(-2x_1/p + 1/p^2)) \\ &= 4I_2^2 \cdot 2\pi W_{20}\Delta x/p \cdot \tfrac{1}{2}[1 - \cos^2(\psi_0 - \omega t + 2\pi W_{20}(-2x_1/p + 1/p^2))] \end{aligned} \quad (26)$$

Finally, a focusing error signal Sf is obtained by passing the Signal $S_M$ through the low pass filter 18 capable of passing signal component whose angular frequency is smaller than $2\omega$, which is as follow:

$$Sf = 2I_2^2 \cdot 2\pi W_{20}\Delta x/p \quad (27)$$

Since the signal Sf is an odd function of the wavefront aberration coefficient $W_{20}$, i.e., the amount of off-focusing $\Delta f$, it can be used to correct the focusing according to the known method.

In the conventional focusing error detection device, the focusing error signal is produced by a synchronous detection of the difference signal from the two optical detecting elements with using the sum signal thereof as a reference signal. Therefore, both of the difference signal and the sum signal must be single frequency signals variable with time. This means that it requires, in the information recording medium, a constant spatial frequency in a direction parallel with the information track. Therefore, since it is impossible for some information recording medium such as the compact disc in which information is recorded by modulating it to the pit length and the pit gap to derive single frequency signal to be used as the reference signal, it is impossible to produce the focusing error signal.

Further, even for an information recording medium such as the magneto-optical disc which has a continuous guide groove and in which there is no information recorded in the form of phase pit or amplitude pit in a direction parallel with information tracks, it is impossible to produce a focusing error signal by the conventional focusing error detection device.

DISCLOSURE OF THE INVENTION

The present invention was made in view of elimination of such problems as above and an object thereof is to provide a focusing error detection device capable of producing a focusing error signal even for an information recording medium having no periodicity in a direction parallel with information tracks thereof. Another object of the present invention is to provide a focusing error detection device which requires substantially no additional optical element (cylindrical lens, prism etc.) which is the feature of the conventional device for production of such focusing error signal and in which a positional adjustment of an optical sensor for focusing error detection is much facilitated.

A focusing error detection device according to the present invention produces a focusing error signal by arranging an optical sensor for focusing error detection which composed of a plurality of optical detecting elements in a far field of an information recording medium, providing a plurality of light sources for producing a plurality of focused light spots in a direction perpendicular to information tracks thereof and processing interference fringes produced in the far field of the information recording medium by these light sources by using the optical sensor and an operation circuit and a control circuit which are connected to an output of the optical sensor.

In the present invention, the plurality of light sources juxtaposed vertically with respect to the information tracks produce interference fringes having constant phase relation to each other in the far field of the information recording medium. The focusing error detection sensor having the optical elements arranged in an interference region of the 0 order light reflected from the information recording medium and 1st order light reflected and diffracted by the information tracks detects interference fringes produced due to diffraction phenomenon by the information tracks. Further, the light sources and the operation circuit which operate in synchronism with each other analyse the interference fringes to produce the focusing error signal.

As mentioned, according to the present invention in which the focusing error signal is produced by scanning vertically with respect to the information track the focused light spots on the information recording medium produced with the plurality of light sources and analysing interference fringes resulting from diffraction by the information tracks by means of the optical sensor disposed in the far field of the medium and the electronic circuits connected thereto, it is possible to produce the focusing error signal stably even if the information recording medium is that having discrete pit length and/or pit distance or that having a continuous guide groove. Further, it is possible to provide a focused light spot position detecting device whose optical system is simplified and positional adjustment of the optical sensor is much facilitated.

BEST MODE OF PRACTICING THE PRESENT INVENTION

Figure 1:
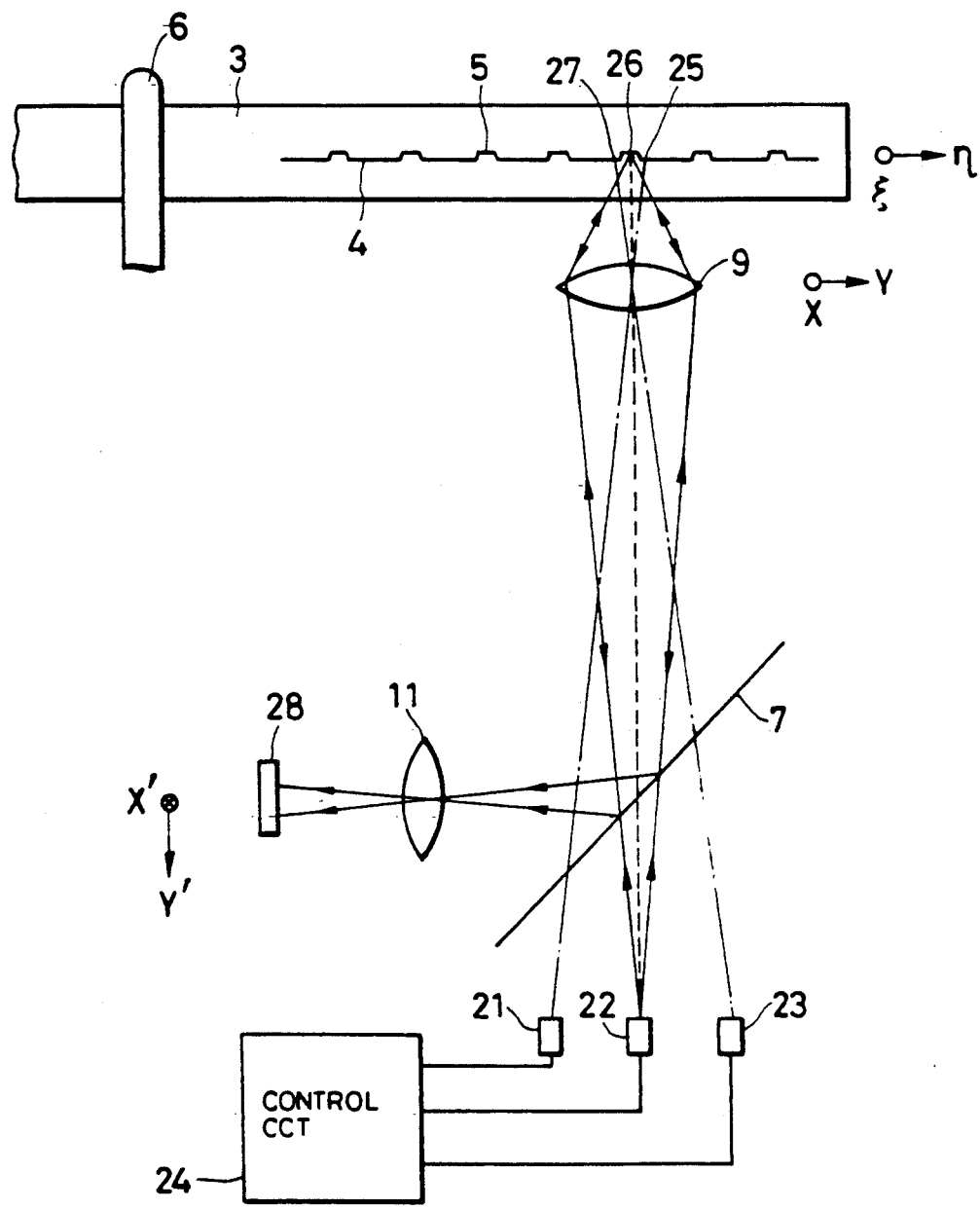
FIG. 1 shows a construction of an optical system according to an embodiment of the present invention.
Figure 2:
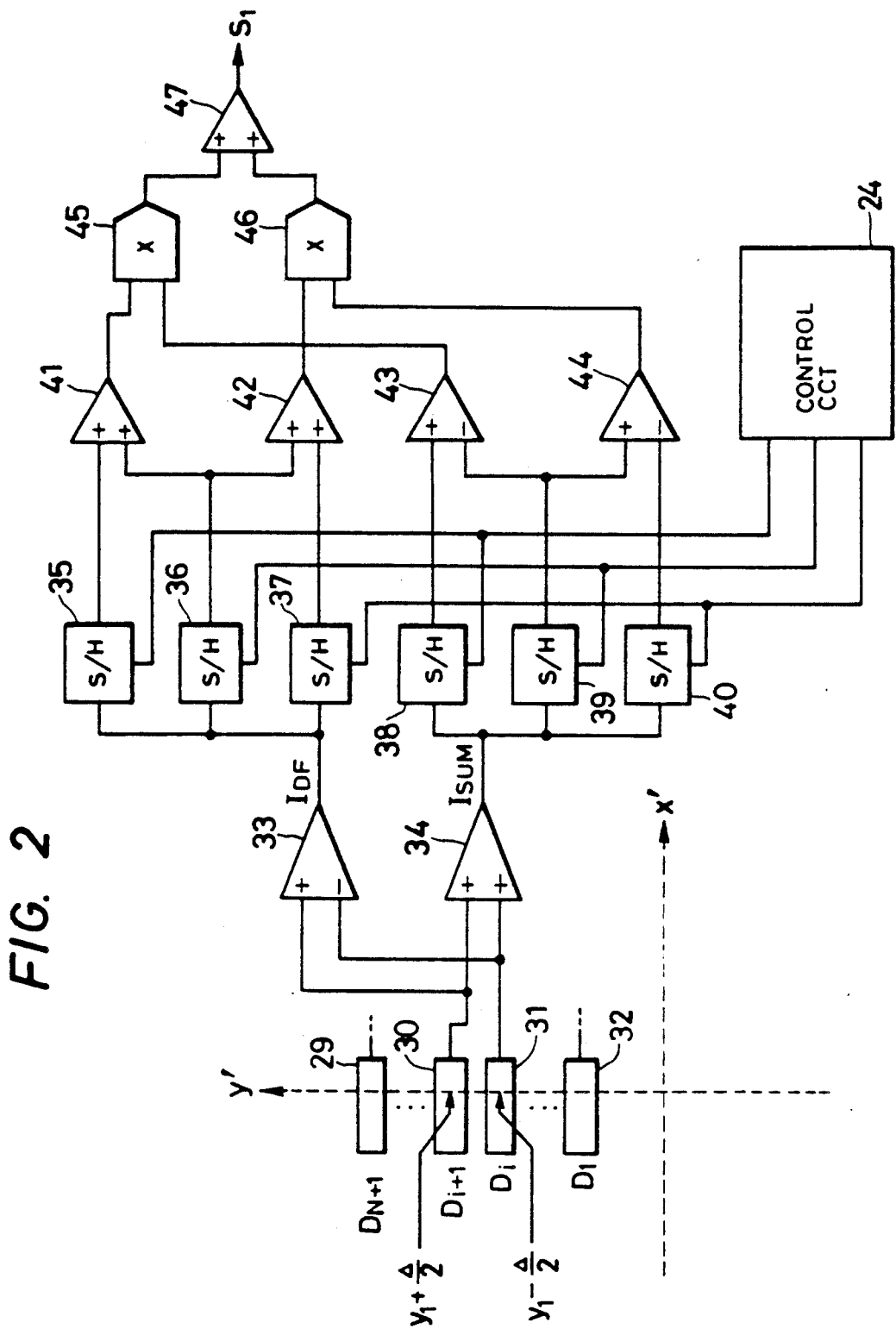
FIG. 2 shows an optical sensor and an electronic circuit for detecting a focusing error according to an embodiment of the present invention.

In FIGS. 1 and 2 which show a construction of an embodiment of the present invention, reference numerals 3 to 7, 10 and 11 depict the same components as those of the conventional device.

In FIGS. 1, 21, 22 and 23 depict light sources such as semiconductor lasers, 24 a control circuit for on-off controlling the light sources 21, 22 and 23, 25, 26 and 27 spots of lights emitted from the light sources 21, 22 and 23, respectively, and 28 an optical sensor composed of a plurality of sensor elements for focusing error detection.

In FIG. 2, 29, 30, 31 and 32 depict the sensor elements of the optical sensor 28, 33 a subtractor, 34 an adder, 35 to 40 sample-hold circuits, 41 and 42 adders, 43 and 44 subtractors and 47 an adder. Reading of data by the sample-hold circuits 35 to 40 is performed in synchronism with the on-off operation of the light sources 21 to 23.

The principle of focusing error detection of the present device is based on the fact that, when an information is written in or read out from an information recording surface acting as diffraction grating as in the conventional device, there is a phase difference produced between the 0 order light directly reflected by the information recording medium and the ±1st order light reflected and diffracted by information tracks, which corresponds to a focusing error.

Although, in the conventional device, the phase difference between the ±1st order light reflected and diffracted by the row of pits and the 0 order light, a phase difference between the 0 order light and the ±1st order light reflected and diffracted by information tracks, in this embodiment. Therefore, although, in the conventional device, the row of information pits must have single spatial frequencies at least partially, there is no such requirement in this embodiment since the phase difference between the 0 order light and the 1st order light is detected by scanning the light spots on the information recording medium vertically with respect to the information tracks.

Figure 3:
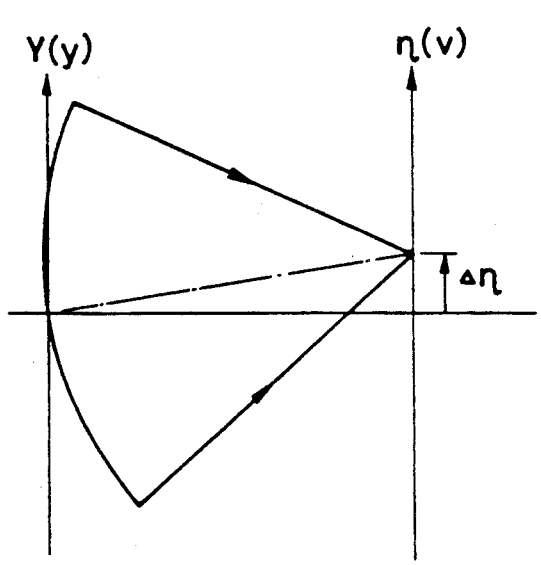
FIG. 3 shows a coordinate system and a lateral ovement of focused light spot for explanation of the principle of the present invention.

Now, the principle of focusing error detection of the present device will be described in detail with reference to the coordinate system and information recording medium model used in explaning the conventional device. Since, in the present device, positions of light spots are discretely scanned vertically to the information tracks 5, it is necessary to express the effect of lateral movement of the light spot mathematically. As shown in FIG. 3, assuming an amount of movement of the spot in the direction of the η axis as Δη, aberration coefficient $W_{11}$ of the lateral movement of image corresponding to $\Delta\eta$ is given by $$W_{11} = \Delta\eta/(\lambda/NA) \tag{19}$$

Therefore, an amplitude distribution $a(x,y)$ of irradiation light on the exit pupil plane of the objective lens can be expressed as follows:

$$a(x,y) = \begin{cases} \tau(x,y) \cdot \exp[2\pi i (W_{11}y + W_{20}(x^2 + y^2))] : x^2 + y^2 < 1 \\ 0 : x^2 + y^2 > 1 \end{cases} \tag{20}$$

Figure 4:
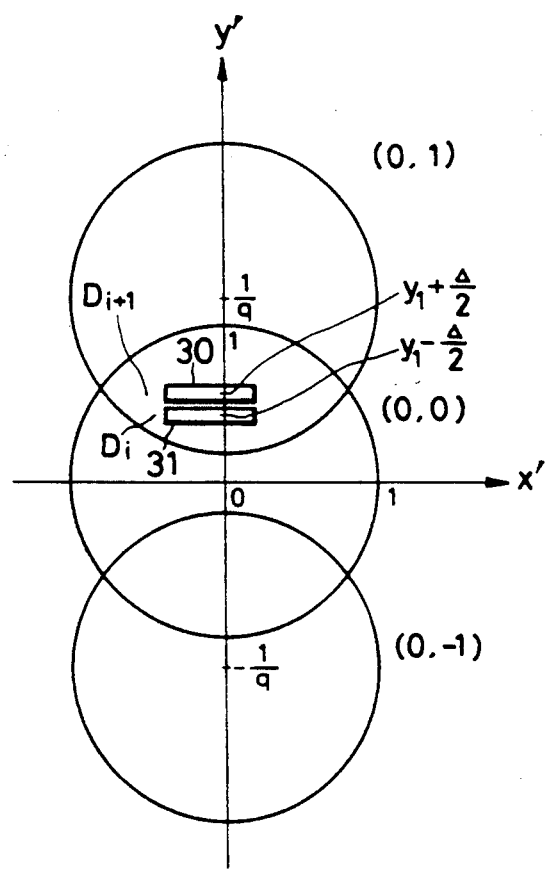
FIG. 4 shows a positional relaion between a reflected light from an information recording medium and the optical sensor.

Then, the amplitude distribution $A_{D0,1}(x',y')$ of reflected light on optical elements 30 and 31 arranged in an interference region of the (0,0) order reflected light and the (0,1) order reflected and diffracted light as shown in FIG. 4 will be considered.

$A_{D0,1}$ is given by the equation 8 as follow:

$$A_{D0,1}(x',y') = R_{o,o}\, a(-x',-y') + R_{o,1}\exp(-2\pi i\nu_0/q)\cdot a(-x',-y'+1/q) \tag{21}$$

Assuming a magnitude ratio between Fourier coefficients $R_{o,o}$ and $R_{o,1}$ and a phase difference as $\alpha_1$ and $\psi_1$, respectively, the following equation is established $$R_{o,1} = \alpha_1\, e^{i\psi_1}\, R_{o,o} \tag{22}$$

By inserting the equation (22) into the equation 21, the latter can be written as follow:

$$A_{D0,1}(x',y') = R_{o,o}(a(-x',-y') + \alpha_1 e^{i\psi_1}\exp(-2\pi i\nu_0/q)a(-x',-y'+1/q)) \tag{23}$$

By inserting the equation 20 into the equation 23, with the amplitude of pupil function being constant ($\tau(x,y)=1$) in the similar manner to the conventional device, the following equation is established:

$$A_{D0,1}(x',y') = R_{o,o}(\exp[\pi i(-W_{11}y' + W_{20}(x'^2 + y'^2))] + \alpha e^{i\psi_1}\exp(-2\pi i\nu_0/q)\cdot \exp[2\pi i(W_{11}(-y' + 1/q) + W_{20}(x'^2 + (-y' + 1/q)^2)]) \tag{24}$$

and the intensity distribution is obtained by squaring the equation 24, as follow:

$$|A_{D0,1}(x',y')|^2 = |R_{o,o}|^2[(1+\alpha_1)^2 + 2\alpha_1 \cos(\psi_1 - 2\pi\nu_0/q + 2[W_{11}/q + W_{20}(-2y'/q + 1/q^2)])] \tag{25}$$

In this embodiment, the magnitude and sign of $W_{20}$ existing in the phase term of interference fringes are detected by scanning the light spots in the direction traversing the information tracks, i.e., by varying $W_{11}$. Therefore, as show in FIGS. 2 and 4, the output currents $I_{D1}$ and $I_{D2}$ of the optical sensor elements 30 and 31 arranged along the $x'$ direction are given as follows:

$$I_{D1} = K_1|R_{o,o}|^2[(1+\alpha_1)^2 + 2\alpha_1 \cos(\psi_1 - 2\pi\nu_0/q + 2\pi W_{11}/q + 2\pi W_{20}(-2(y-\Delta/2)/q + 1/q^2))] \tag{26}$$

$$I_{D2} = K_1|R_{o,o}|^2[(1+\alpha_1)^2 + 2\alpha_1 \cos(\psi_1 - 2\pi\nu_0/q + 2\pi W_{11}/q + 2\pi W_{20}(-2(y+\Delta/2)/q + 1/q^2))] \tag{27}$$

where $(y-\Delta/2)$ and $(y+\Delta/2)$ are center positions of the optical sensor elements having the same light receiving areas and widths in the $y'$ direction small enough compared with lengths in the $x'$ direction, the width being small enough compared with the period of the interference fringes, and $K_1$ is a constant proportional to the sensitivity of the optical sensor and the light receiving area thereof. Then, putting $$I_0 = K_1|R_{o,o}|^2(1+\alpha_1^2) \tag{28}$$

$$I_1 = K_1|R_{o,o}|^2 \cdot 2\alpha_1 \tag{29}$$

$$\delta = 2\pi W_{11}/q \tag{30}$$

$$\beta_1 = \psi_1 - 2\pi\nu_0/q \tag{31}$$

and rewriting the equations 26 and 27, the following equations are obtained:

$$I_{D1} = I_0 + I_1 \cos[\beta_1 + \delta + 2\pi W_{20}(-2(y_1-\Delta/2)/q + 1/q^2)] \tag{32}$$

$$I_{D2} = I_0 + I_1 \cos[\beta_1 + \delta + 2\pi W_{20}(-2(y_1+\Delta/2)/q + 1/q^2)] \tag{33}$$

Finally, the differential output $I_{DF}$ and the sum output $I_{SUM}$ of the two sensor elements are calculated, according to the following equations:

$$\begin{aligned}I_{DF} &= I_{D2} - I_{D1} \\ &= 2I_2 \sin(2\pi W_{20}\Delta/q)\sin(\beta_1 + \delta + 2\pi W_{20}(-2y_1/q + 1/q^2))\end{aligned} \tag{34}$$

$$\begin{aligned}I_{SUM} &= I_{D2} + I_{D1} \\ &= 2I_0 + 2I_2\cos(2\pi W_{20}\Delta/q)\cdot \\ &\quad \cos(\beta_1 + \delta + 2\pi W_{20}(-2y_1/q + 1/q^2))\end{aligned} \tag{35}$$

When a distance between the two sensor elements is small enough ($\Delta \ll 1$) and the off-focusing is also small ($|W_{20}| < 1$) where the following inequality is established, $$2\pi W_{20}\Delta/q \ll 1 \tag{36}$$

the following equations are established.

$$\sin(2\pi W_{20}\Delta/q) = 2\pi W_{20}\Delta/q \tag{37}$$

$$\cos(2\pi W_{20}\Delta/q) = 1 \tag{38}$$

Therefore, the equations 34 and 35 can be simplified as follows:

$$I_{DF} = 2I_1 \cdot 2\pi W_{20}\Delta/q \cdot \sin[\beta_1 + \delta + 2\pi W_{20}(-2y_1/q + 1/q^2)] \tag{39}$$

$$I_{SUM} = 2I_0 + 2I_2 \cdot \cos[(\beta_1 + \delta + 2\pi W_{20}(-2y_1/q + 1/q^2)] \tag{40}$$

From the equations 39 and 40, the following can be said.

(1) Phases of the differential output $I_{DF}$ and the sum output $I_{SUM}$ are proportional to a track deviation $\nu_0$, aberration coefficient $W_{11}$ of lateral movement of image point and aberration coefficient $W_{20}$ of longitudinal movement of image point (off-focusing aberration).

(2) An amplitude of $I_{DF}$ is porportional to $W_{20}$.

(3) $I_{DF}$ is shifted in phase from $I_{SUM}$ by 90°.

Therefore, by detecting the amplitude of $I_{DF}$, it is possible to detect the focusing error signal. Now, the method of obtaining the focusing error signal by varying in step the aberration coefficient $W_{11}$ of lateral image movement of light irradiation to the information recording medium (i.e., by shifting the light spot on the information recording plane in a direction traversing the information tracks) to scan the interference fringes produced in the interference region of the (0,0) order light and the (0,1) order light will be described.

When the phase term of the interference fringe related to $W_{11}$ shown in the equation 30 is 0, $+\delta_1$ and $-\delta_1$, $I_{Df}$ and $I_{SUM}$ become as follows according to the equations 39 and 40:

$$I_{DF}(0) = K_2 W_{20} \cdot \sin(\beta_1 + \phi_1) \quad (41)$$

$$I_{DF}(\delta_1) = K_2 W_{20} \cdot \sin(\beta_1 + \delta_1 + \phi_1) \quad (42)$$

$$I_{DF}(-\delta_1) = K_2 W_{20} \cdot \sin(\beta_1 - \delta_1 + \phi_1) \quad (43)$$

$$I_{SUM}(0) = K_3 + K_4 \cdot \cos(\beta_1 + \phi_1) \quad (44)$$

$$I_{SUM}(\delta_1) = K_3 + K_4 \cdot \cos(\beta_1 + \delta_1 + \phi_1) \quad (45)$$

$$I_{SUM}(-\delta_1) = K_3 + K_4 \cdot \cos(\beta_1 - \delta_1 + \phi_1) \quad (46)$$

where $$K_2 = 2 I_1 \cdot 2\pi \Delta/q \quad (47)$$

$$\phi_1 = 2\pi W_{20}(-2 y_1/q + 1/q^2) \quad (48)$$

$$K_3 = 2 I_0 \quad (49)$$

$$K_4 = 2 I_1 \quad (50)$$

From the above equations, the following equations are established:

$$I_{DF}(-\delta_1) + I_{DF}(0) = 2 K_2 W_{20} \sin(\beta_1 - \delta_1/2 + \phi_1) \cos \delta_1/2 \quad (51)$$

$$I_{DF}(0) + I_{DF}(\delta_1) = 2 K_2 W_{20} \cdot \sin(\beta_1 + \delta_1/2 + \phi_1) \cos \delta_1/2 \quad (52)$$

$$I_{SUM}(-\delta_1) - I_{SUM}(0) = 2 K_4 W_{20} \sin(\beta_1 - \delta_1/2 + \phi_1) \sin \delta_1/2 \quad (53)$$

$$I_{SUM}(0) - I_{SUM}(\delta_1) = 2 K_4 \sin(\beta_1 + \delta_1/2 + \phi_1) \sin \delta_1/2 \quad (54)$$

Therefore, it is possible to detect $W_{20}$, i.e., to produce the focusing error signal by performing the following operation with $\delta_1 = \pi/2$:

$$(I_{DF}(-\pi/2) + I_{DF}(0))(I_{SUM}(-\pi/2) - I_{SUM}(0)) + \quad (55)$$

$$(I_{DF}(0) + I_{DF}(\pi/2))(I_{SUM}(0) - I_{SUM}(\pi/2)) = \delta I_1^2 2\pi \Delta W_{20}/q$$

Figure 5:
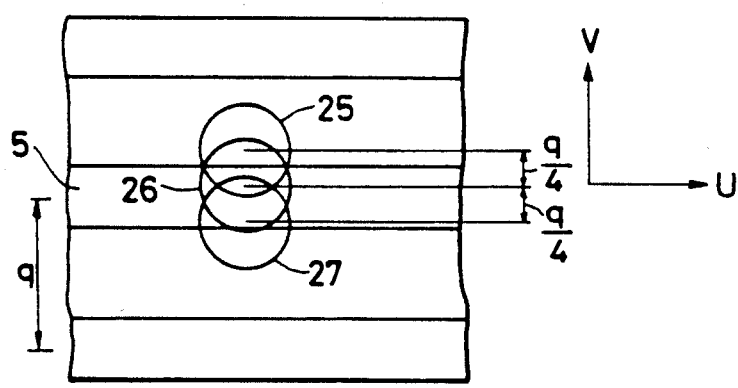
FIG. 5 shows positions of the focused light spots on the information recording medium.

An operation of this embodiment will be described. In order to produce the focusing error signal, the present device performs the following operation. First, the light source 22 is energized and a light spot is moved to a position 26. Although, in FIG. 1, the light spot 26 is positioned at the center of the information track 5 on the information recording medium surface 4, i.e., the focus control and the tracking control are performed perfectly, the spot position may differ from that in FIG. 1, needless to say. The differential output and the sum output of the optical sensor elements are $I_{DF}(0)$ and $I_{SUM}(0)$, respectively, at this state, which are supplied sample-hold circuits 36 and 39, respectively. Then, the light source 22 is deenergized and instead thereof the light source 21 is energized to produce a light spot 25 whose position is deviated vertically upwardly from the spot position 26 by one fourth the track interval, as shown in FIG. 5. In such state, the differential output and the sum output of the optical sensor are $I_{DF}(\pi/2)$ and $I_{SUM}(\pi/2)$, respectively, which are supplied to the sample-hold circuits 37 and 40, respectively. Finally, the light source 21 is denergized and the light source 23 is energized. In the latter case, $I_{DF}(-\pi/2)$ and $I_{SUM}(-\pi/2)$ are obtained. $I_{DF}$ and $I_{SUM}$ obtained by energizing the light sources 21, 22 and 23 sequentially are processed by an operation circuit arranged downstream of the sample-hold circuits according to the equation 55 and a focusing error signal Sf is obtained. Since the semiconductor lasers used for the light sources can be modulated at high speed, it is possible to obtain the focusing error signal which is not influenced by recording signals and is stable, by on-off controlling the light sources at a frequency higher enough than a frequency band of the information signal recorded on the information recording medium.

Although, in the above embodiment, the present invention is described as the focusing error detection device, it is easy to apply to the present device the Radial Wobbling method which is known as the tracking error detection method (cf. G. Bouwhuis et al, "Principles of Optical Disc Systems", Adam Hilger Ltd., p.p. 73 to 75).

Figure 6:
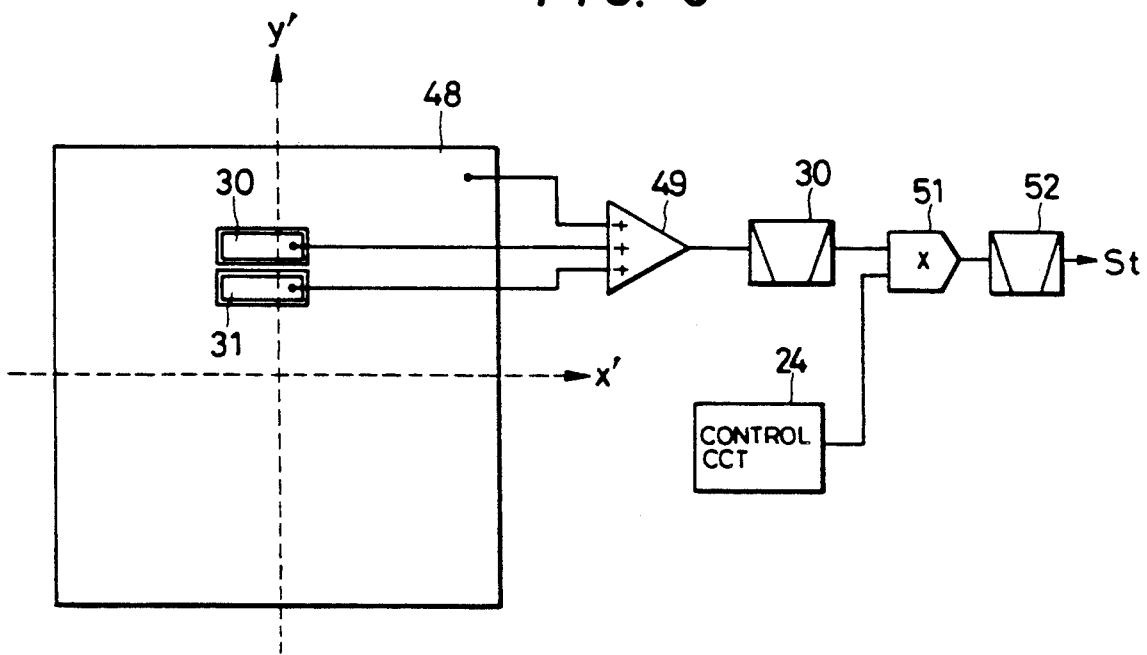
FIGS. 6 and 7 show an optical sensor and an electronic circuit necessary to detect a tracking error.

FIG. 6 shows an optical sensor and an operation circuit which are necessary to detect the tracking error, as an example. In FIG. 6, 48 depicts the optical sensor having a light receiving region which is a peripheral region of optical sensor elements 30 and 31 for the focusing error detection and which is adapted to receive all of the components of reflected light from the information recording medium 4 which passed through the objective lens 9 and reflected by the half mirror 7. 49 depicts an adder for summing signals from the optical sensor elements 30, 31 and the optical sensor 48, 50 a band pass filter, 51 a multiplier and 52 a low pass filter. An operation of this tracking error detection circuit will be described. First, the light sources 21, 22 and 23 are energized sequentially repeatedly with a time interval of from 21 to 22 to 23 to 22 to 21 (a period of $4\tau$) so that a light spot on the information recording plane 4 scans the information tracks 5 traversely from 25 to 26 to 27 to 26 to 25. Inn this case, all of the component of the reflected from the information recording plane 4 which passed through the objecive lens 9 and reflected by the half mirror 7 is received by the optical sensor elements 30 and 31 and the optical sensor 48 and converted into electric signals. These electric signals are added by the adder 49 and a frequency component f (f = $\frac{1}{4}\tau$) thereof is derived by the band pass filter 50. The frequency component from the band pass filter 50 is compared in phase with a reference signal having frequency f supplied from the control circuit 24 by the multiplier 51 and the tracking error signal St is obtained by removing a component of frequency 2 f by the low pass filter 52.

Figure 7:
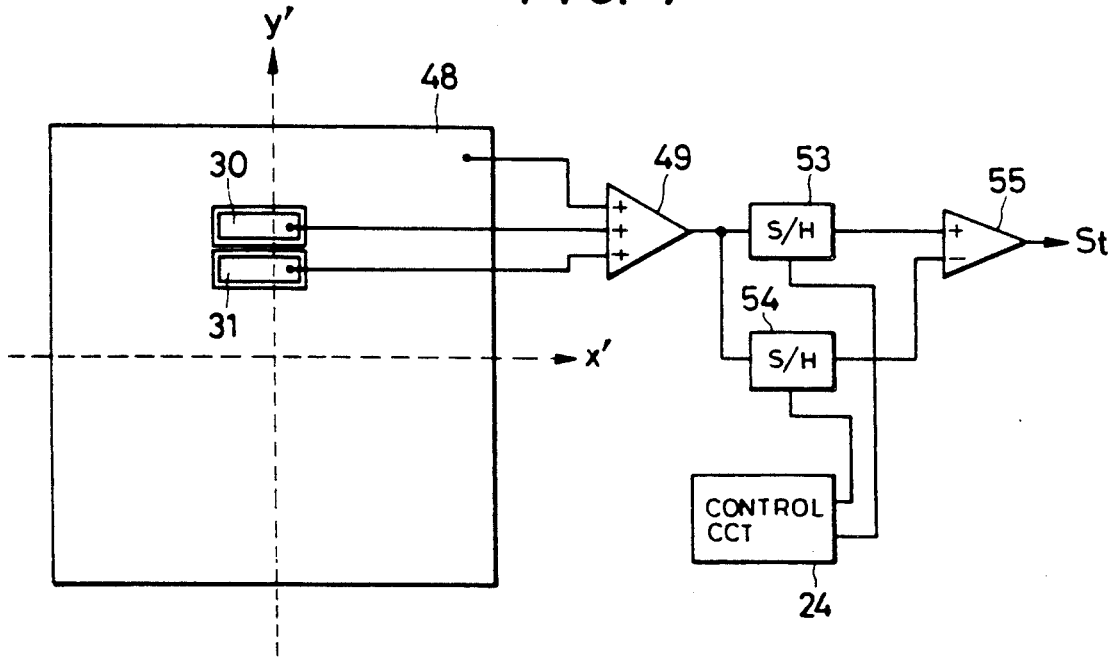

Alternatively, such tracking error signal St can be obtained by using a circuit shown in FIG. 7 which functions similarly to the twin spot method (cf. G. Bouwhuis et al, "Principles of Optical Disc Systems", Adam Hilger Ltd., p.p. 71–72). In FIG. 7, 53 depicts a sample-hold circuit for sampling and holding an electric signal corresponding to a reflected light component from the information recording medium 3 when the light source 21 is energized and 54 a sample-hold circuit for sampling and holding the electric signal when the light source 23 is energized. The tracking error signal can be obtained by differentiating outputs of these sample-hold circuits 53 and 54 by means of a subtractor 55.

In the embodiment shown in FIG. 1, three discrete semiconductor lasers are used as the light sources. Alternatively, it is possible to use independently controllable semiconductor laser arrays (cf. E. Kapon et al, "Control of Mutual Phase Locking of Monolithically Integrated Semiconductor Lasers", Appl. Phys. Lett., 43, (5) pp. 421–423 (1983)) or light sources, light emitting positions at light emitting end surfaces of which can be externally controlled (cf. Shibata et al, "Laser of Transistors", 0 plus E, No. 67, pp. 114–121 (1985)).

Figure 8:
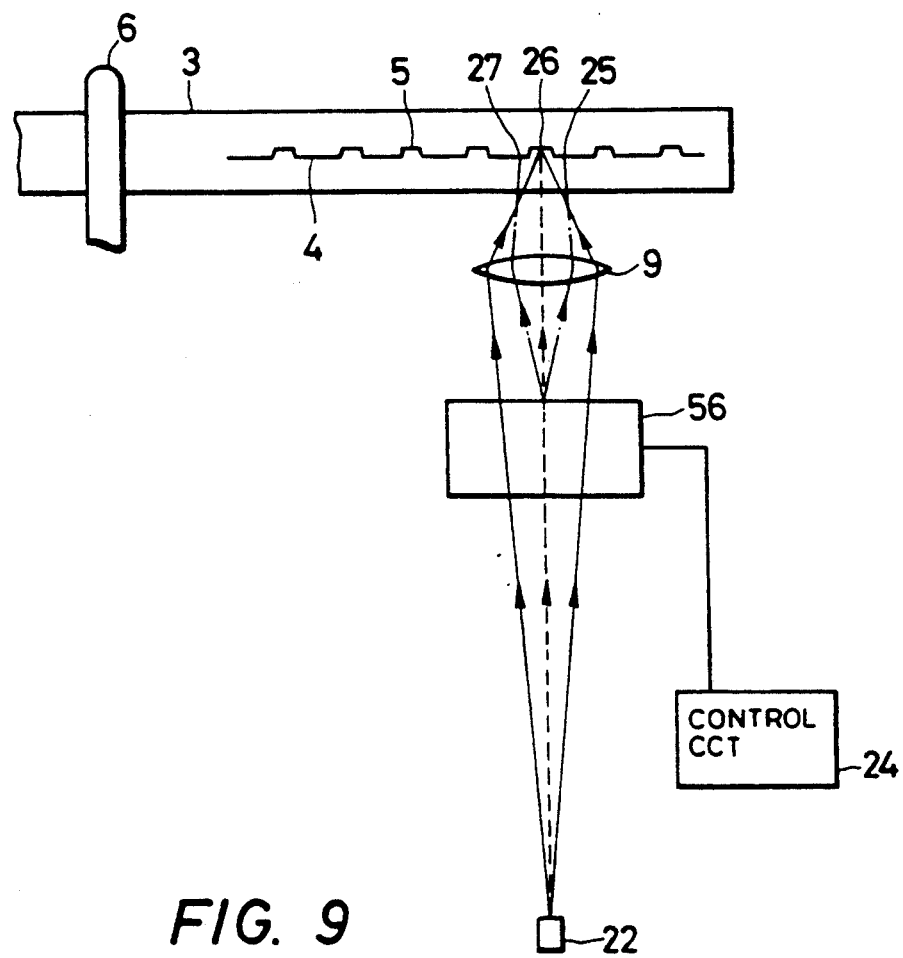
FIG. 8 shows an optical system when an acoustooptical modulator is used as a focused light spot scanner.
Figure 9:
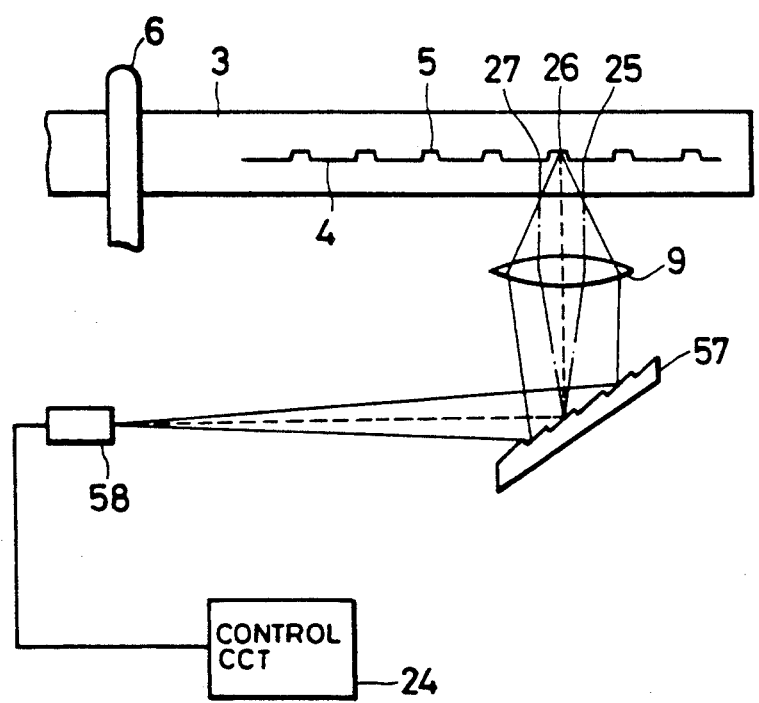
FIG. 9 shows an optical system when a diffraction gratings and wavelength variable light sources are used as the focused light spot scanner.
Figure 10:
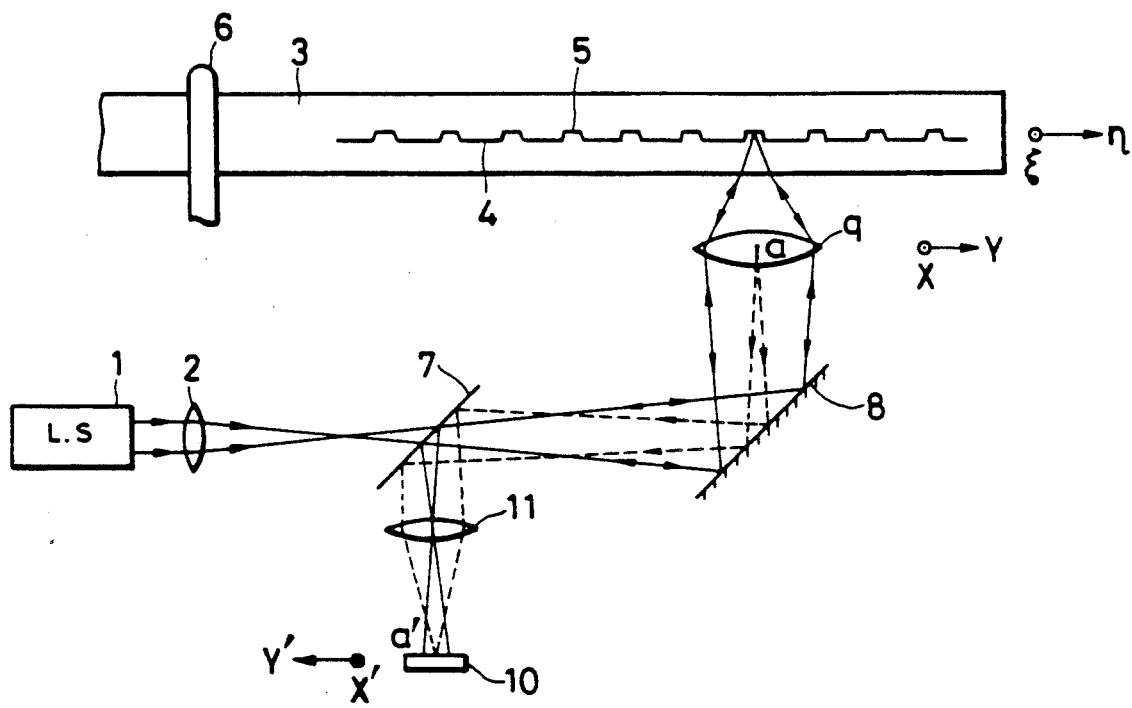
FIGS. 10 and 11 show a construction of a conventional focusing error detection device.
Figure 11:
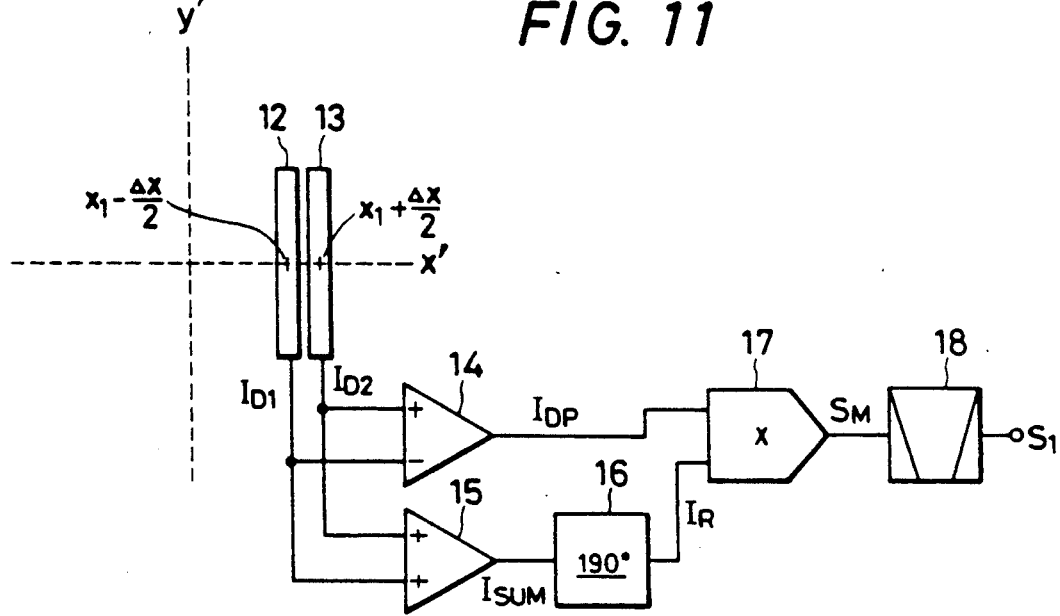
Figure 12:
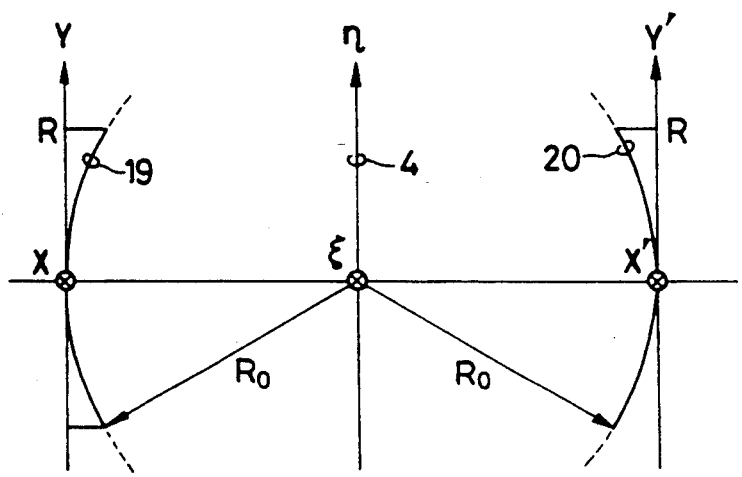
FIG. 12 shows a coordinate system useful to explan the principle of focusing error detection.
Figure 13:
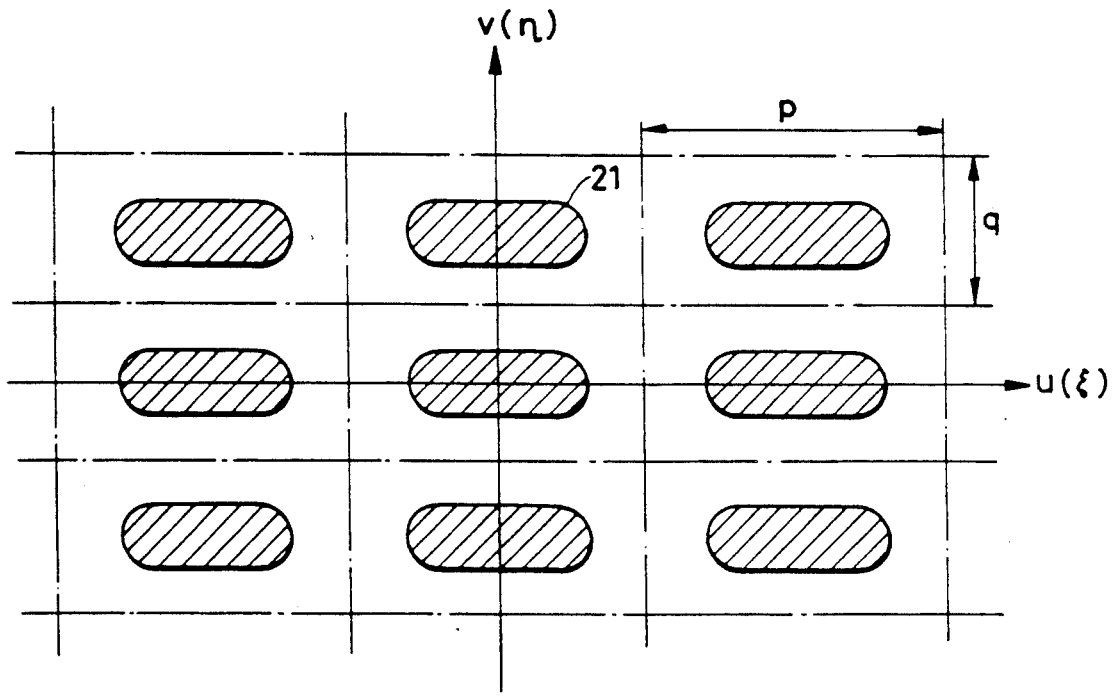
FIG. 13 shows information pits on the information recording medium.
Figure 14:
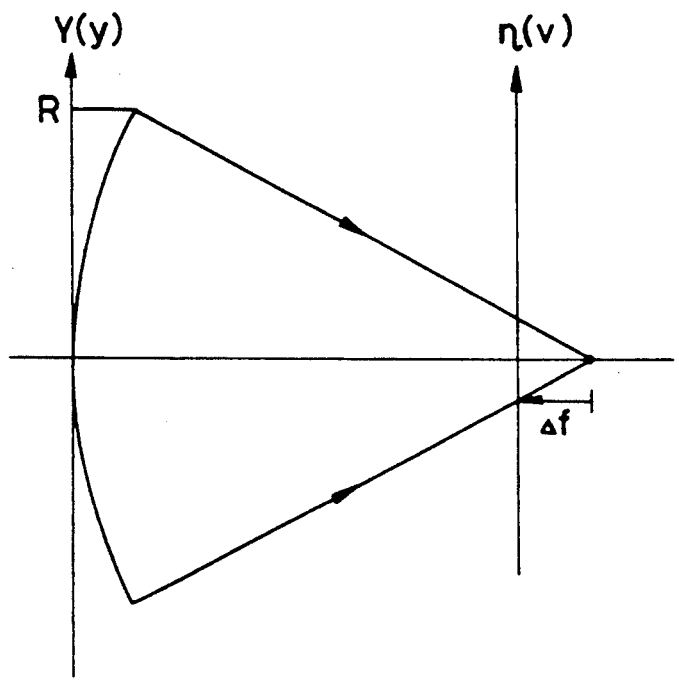
FIG. 14 illustrates off-focusing state.
Figure 15:
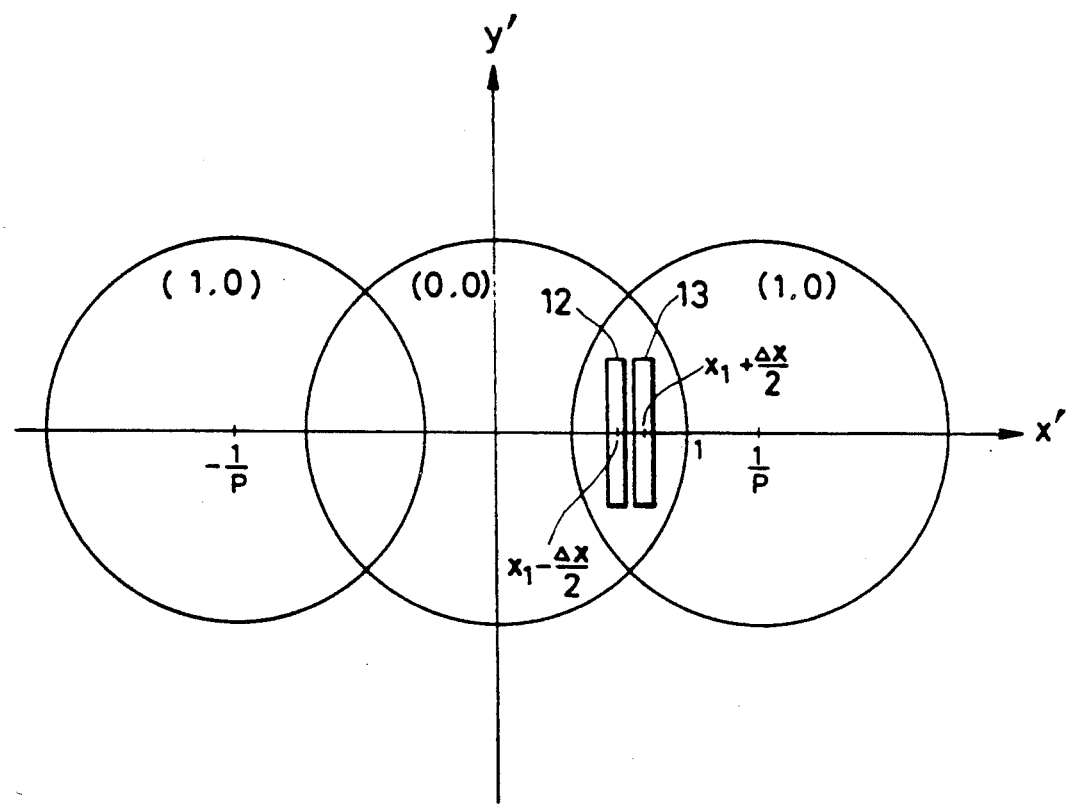
FIG. 15 shows a positional relation between reflected light from information recording medium and an optical sensor in the conventional device.

As an alternative method of scanning the information tracks laterally thereof with the light spot on the information recording plane 5, it is possible to use an acoustooptical deflector 56 arranged between the light source 22 and the objective lens 9, as shown in FIG. 8. Further, when a wavelength variable light source can be used, such scanning can be realized by using a diffraction grating having a large wavelength dispersion as a deflection means and changing an oscillation wavelength of a light source 58, as shown in FIG. 9. As such wavelength variable light source, a semiconductor laser is known whose output wavelength can be changed by an injection current (cf. L. Goldberg et al, "Frequency Modulation Characteristics of Coupled Stripe Laser Diode Array", IEEE J. Quantum Electron., QE-22, pp. 513–516(1986)).

POSSIBILITY OF INDUSTRIAL UTILIZATION

The present invention can be applied to not only the focused-spot-position detector of the optical information recording and reproducing device such as the optical disc device but also to an optial spot position detection for other optical recording medium or articles.

What is claimed is:

1. In a focused-spot-position detecting device for an optical information recording and reproducing device including light source means, focusing means for focusing a light beam from said light source means onto an information recording medium having information tracks, light beam separating means for separating a reflected light beam from said information recording medium from said light beam from said light source means, an optical sensor for converting said reflected light beam into an electric signal and a control signal generator responsive to an output signal of said optical sensor for producing a control signal for correcting a focus point of said focusing means and correcting a tracking, an improvement characterized by said light source means comprising a plurality of light sources capable of being on-off controlled by a control circuit and arranged such that focus points of light beams of said light sources are juxtaposed vertically with respect to said information tracks on said information recording medium, said optical sensor comprising at least two optical sensor elements each having a light receiving region having a major length in parallel with said information tracks, said optical sensor elements being arranged in a far field from said information recording medium, further comprising an operation circuit for sampling and holding a differential output signal and a sum output signal of said optical sensor elements in synchronism with the on-off energizations of said light sources and operating the sample-hold outputs to obtain a focusing error signal, wherein said light source means includes three light sources, and wherein said three light sources comprise a first light source between second and third light sources, and wherein said operation circuit obtains said focusing error signal by performing the following expression:

$$\{I_{DF}(-\pi/2)+I_{DF}(0)\}\cdot\{I_{SUM}(-\pi/2)-I_{SUM}(0)\}+\{I_{DF}(0)+I_{DF}(\pi/2)\}\cdot\{I_{SUM}(0)-I_{SUM}(\pi/2)\},$$

where $I_{DF}(0)$ and $I_{SUM}(0)$ are said differential output signal and said sum output signal, respectively, of said optical sensor elements when said first light source is lit, $I_{DF}(\pi/2)$ and $I_{SUM}(\pi/2)$ are said differential output signal and said sum output signal, respectively, when said second light source is lit, and $I_{DF}(-\pi/2)$ and $I_{SUM}(-\pi/2)$ are said differential output signal and said sum output signal, respectively, when said third light source is lit.

* * * * *